Patented Apr. 15, 1947

2,418,843

UNITED STATES PATENT OFFICE 2,418,843

FIRE-RESISTANT COATING COMPOSITION

Martin Leatherman, Hyattsville, Md.

No Drawing. Original application June 20, 1942, Serial No. 447,871. Divided and this application June 30, 1945, Serial No. 602,648

2 Claims. (Cl. 260—32)

(Granted under the act of March 3, 1883, as amended April 30, 1928; 370 O. G. 757)

This application is a division of my co-pending application Serial No. 447,871, filed June 20, 1942, which issued as U. S. Patent No. 2,407,668 on September 17, 1946.

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to fire retarding or fire resistant coatings for fibrous materials in filamentary or foraminous, reticulated form, whether woven, felted or in layers and is applicable to cotton, rayon, wool, silk and the like.

My invention is adaptable to make various types of finished articles. It can be used to produce a water repellant but porous finish or it can be used to produce a rubber-like coating which is impermeable to air. If the fabric to be coated is immersed in my composition and then squeezed lightly, a thin fabric such as 80 square print cloth shows numerous tiny pinholes which permit free passage of air, but which offer considerable resistance to the passage of water. If the dipped fabric is immediately brushed on one side with my composition, an elastic flexible rubber-like and impermeable finish results which adheres tightly to the dipped and squeezed fabric. The unbrushed side retains its soft fabric-like appearance and feel. If, however, the dipped and lightly squeezed fabric is again dipped and excess composition scraped off without squeezing, an adherent rubber-like finish is imparted to both faces of the fabric.

The resinous constituent of my composition is a vinyl polymer termed polyvinyl chloride.

A second constituent of my composition is zinc carbonate. It is the interaction of the vinyl polymer with the zinc carbonate which imparts fire resistance to the fibrous materials when coated with my composition. When the coated material is subjected to ignition temperatures, the vinyl polymer decomposes with evolution of hydrochloric acid which, in addition to possessing excellent flame preventing properties, reacts with the zinc carbonate to liberate carbon dioxide and catalytically active zinc oxide. The zinc oxide acts as a dehydration catalyst in the case of cellulosic materials to split the carbohydrate into water and carbon, thus assisting in preventing flaming.

A third constituent of my composition may be some form of opaque pigment which while not required as a flameproofing ingredient, may be desirable to screen out light which in some cases acts detrimentally on the vinyl polymer constituent. A fourth constituent is a suitable plasticizer or softener, a preferred form of which is tricresyl phosphate although certain chlorinated diphenyls, dibutyl phthalate, triphenyl phosphate or any other compatible plasticizer or mixture of plasticizers may also be used.

In practicing my invention a preferred method is to dissolve the resinous constituent together with the plasticizer in compatible solvents and suspend the zinc carbonate and pigments in the solution by any suitable dispersion method. The effect obtained is in large measure determined by the proportion of solvent or diluent present.

The following example of a composition embodying my invention is given by way of illustration but not of limitation.

*Example*

20 lbs. polyvinyl chloride, 8 lbs. of zinc carbonate, 8 lbs. of tricresyl phosphate, 7 lbs. triphenyl phosphate, 7 lbs. of inert pigment, 45 lbs. of acetone, 0.8 lbs. zinc naphthenate and ½ lb. of pentachlorphenol.

As additional ingredients I also employ such fungicides as pentachlorphenol, copper naphthenate, cadmium naphthenate, zinc naphthenate, zinc pentachlorphenate, halogenated phenyl phenates and the like in amounts approximating 1% of the weight of the fibrous material.

The coating characteristics are largely determined by the viscosity of the coating composition. If the visosity is reduced by addition of solvent, an impregnated type of finish is obtained upon evaporation of solvent, that is, the fibrous material absorbs the composition and the pores remain open. With increased viscosity, penetrative qualities of the composition are decreased and a continuous film or coating of a rubber-like nature covers the whole surface of the fabric. In this form the coating is impervious to air. An advantage of this continuous film lies in the fact that, because of the thermoplasticity of my composition, the coated fabric can be lapped and caused to form a strong bond by the application of heat.

It is understood that the example above cited can be varied with respect to the proportions of all constituents. I may vary the proportion of zinc carbonate to vinyl polymer. A preferred range is from 1 part zinc carbonate to 1½ parts of vinyl polymer to 1 part zinc carbonate to 3 parts of vinyl polymer. The absolute amount of inert pigment used will vary with the severity of weather exposure and with the type of pigment used. The proportion of plasticizer will vary with the degree of flexibility desired and with the type of plasticizer used. Finally the solvent employed can be any individual solvent or blend of solvents which is compatible with the synthetic resin mixture in my composition. Among the solvents which can be employed at least in part are acetone, ethanol, butanol, isobutanol, diacetone alcohol, xylol, toluol, naphtha or Stoddard solvent.

I claim:

1. A composition for rendering the fabric rot- and fire-resistant, comprising the following materials in substantially the proportions stated: 20 lbs. polyvinyl chloride, 8 lbs. zinc carbonate, 8 lbs. tricresyl phosphate, 7 lbs. triphenyl phosphate, 45 lbs. acetone, 7 lbs. inert pigment, 0.8 lb. zinc naphthenate, and ½ lb. pentachlorphenol.

2. A composition for rendering fabric rot- and fire-resistant, comprising the following materials in substantially the proportions stated: 20 lbs. polyvinyl chloride, 8 lbs. zinc carbonate, 8 lbs. tricresyl phosphate, 7 lbs. triphenyl phosphate, and 45 lbs. acetone.

MARTIN LEATHERMAN.